United States Patent [19]

Lindsay et al.

[11] Patent Number: 5,151,148
[45] Date of Patent: Sep. 29, 1992

[54] SYSTEM FOR RETREADING TIRES

[75] Inventors: Robert B. Lindsay, Akron; Gary C. Parrish, Uniontown, both of Ohio

[73] Assignee: The Goodyear Tire & Rubber Company, Akron, Ohio

[21] Appl. No.: 572,290

[22] Filed: Aug. 27, 1990

Related U.S. Application Data

[62] Division of Ser. No. 357,148, May 26, 1989, Pat. No. 5,055,148.

[51] Int. Cl.⁵ .............................................. B29D 30/56
[52] U.S. Cl. ................................... 156/351; 156/366; 156/382; 156/394.1; 156/909; 425/17
[58] Field of Search .................... 156/96, 909, 394.1, 156/130.5, 358, 359, 366, 378, 382, 421.2, 351; 425/18, 17

[56] References Cited

U.S. PATENT DOCUMENTS

| | | |
|---|---|---|
| 2,966,936 | 1/1961 | Schelkmann . |
| 2,976,910 | 3/1961 | Nowak . |
| 3,325,326 | 6/1967 | Schelkmann . |
| 3,989,563 | 11/1976 | Schelkmann ........................ 156/96 |
| 4,028,168 | 6/1977 | Wolfe ................................ 156/96 X |
| 4,151,027 | 4/1979 | Schelkmann et al. . |
| 4,201,610 | 5/1980 | Brodie et al. ........................ 156/96 |
| 4,274,897 | 6/1981 | Barefoot . |
| 4,299,647 | 11/1981 | DeHaven . |
| 4,309,234 | 1/1982 | Witherspoon . |
| 4,434,018 | 2/1984 | Brewer . |

OTHER PUBLICATIONS

Magnabosco-Tire Retreading System (undated).

Primary Examiner—Geoffrey L. Knable
Attorney, Agent, or Firm—David L. King

[57] ABSTRACT

A method and system for retreading tire carcasses (10) with precured treads utilizing time and temperature in conjunction with an envelope pressure system. A precured rubber tread (12), is applied to tire carcass (10) having a cushion gum (16) disposed therebetween. An envelope system is placed over the tread/carcass and this assembly is placed within a pressure chamber. Heat and fluid pressure are then supplied to the chamber. Fluid pressure is then supplied to the chamber after both a predetermined length of time and after a predetermined temperature of the chamber has been reached.

5 Claims, 5 Drawing Sheets

SYSTEM FOR RETREADING TIRES

This is a divisional of application Ser. No. 07/357,148, filed on May 26, 1989, now U.S. Pat. No. 5,055,148.

BACKGROUND OF THE INVENTION

This invention relates generally to the retreading of tires. More particularly this invention relates to the retreading of tire casings with precured treads.

Traditionally a precured rubber tread is applied over the crown region of a tire casing in which a layer of vulcanizable rubber-based material or cushion gum is interposed between the tread and the tire casing. A flexible airtight member or envelope is then placed over the tread to cover at least a portion of the sidewalls of the tire casing. The envelope helps to provide pressure to the tread to enhance the bonding of the tread to the tire casing. It has been found that this method does not apply pressure uniformly over the entire bonding line. The envelope tends to bridge the groove areas causing a lower pressure to be applied at the base of the groove as opposed to the remainder of the tread. This unequal pressure can cause irregularities, such as reduction of nonskid, tread distortion, etc. Such problems have been set forth in U.S. Pat. No. 3,325,326 to Schelkmann.

In order to overcome these problems it was determined to apply fluid pressure to the envelope at a reduced pressure from that of the chamber curing temperature. Several such systems are disclosed in U.S. Pat. Nos. 3,325,326, 4,151,027 to Schelkmann et al. and 4,434,018 to Brewer. In each of these systems it is believed that by maintaining a pressure differential of about 15 psi between the pressure under the envelope and the chamber, the bridging effects of the envelope will be reduced. Specifically in U.S. Pat. No. 4,151,027 and 4,434,018 the 15 psi differential is maintained once the chamber pressure reaches 15 psi until the end of the cure cycle.

However, it has been found that during a cure cycle that the cushion gum does not soften, flow and cure uniformly across the bond line. As used herein, the bond line is the interface in cross-section between the tread and the tire casing in the axial direction. In other words the bond line extends from one axial tread edge to the other axial tread edge. This non-uniformity associated with the bond line can still result in tread distortion and reduced adhesion of the tread to the tire casing.

Another problem which can result from keeping a constant pressure differential between the chamber and the envelope is that too great of a pressure can be added before the tread edges are sealed, that is cured to the tire casing. This can result in infiltration of air, steam or other contaminants between the tread and the tire casing, thereby affecting the bond there between and/or the useful life of the treaded tire. For example, this can result when a leak in the envelope develops before the chamber pressure reaches its cure pressure.

SUMMARY OF THE INVENTION

It, therefore, is an object of the invention to provide an improved method and system for retreading tires.

It is also an object of the invention to provide for the sealing of the tread edges to the tire carcass before curing the remainder of the tread to the tire carcass.

It is another object of the invention to optimize the curing pressure applied to the tread/tire assembly during cure.

It is still another object of the invention to provide adhesion uniformity of the tread to the tire casing.

It is still another object of the invention to prevent the failure of the retread when rapid pressurization of the chamber occurs prior to the tread edges and tread splice curing.

It is still further another object of the invention to prevent the failure of the retread if the envelope would break or leak prior to the chamber reaching full curing pressure.

It is a feature according to one embodiment of the invention that the envelope pressures are varied at different stages during the cure cycle independently of the chamber pressure.

It is a feature according to one embodiment of the invention to supply fluid pressure to the envelope after the chamber has reached a predetermined temperature and after a predetermined length of time has elapsed.

It is another feature according to one embodiment of the invention that the pressure under the envelope is maintained considerably less than the operating or curing pressure of the chamber for a predetermined amount of time and for a predetermined temperature.

It is still another feature according to one embodiment of the invention to provide for the sealing of the tread edges to the tire casing before curing the remainder of the tread to the tire casing.

It is an advantage according to this invention that the risk of process failure of the retreaded tire is reduced due to air infiltration of the cushion gum.

It is another advantage of this invention that the uniformity of the bonding between the tread and the tire casing is improved, resulting in a reduction in tread distortion during cure.

It is another advantage of this invention that a leak in the envelope early in the cure cycle prior to the chamber reaching the full cure pressure will be automatically vented.

It is still another advantage of the invention that the fluid pressure supplied to the envelope can be air, steam, etc. and can be supplied from an external source or from the chamber.

These and other objects, features, and advantages can be accomplished by a method of retreading a tire comprising the steps of:

a) applying a precured rubber tread to a crown region of a tire casing having a layer of vulcanizable material interposed between the tread and a crown region of the tire casing:

b) covering the tread and at least a portion of both sidewalls of the tire casing with a flexible airtight member to form an assembly;

c) placing the assembly within a pressure chamber and supplying both fluid pressure and heat to said pressure chamber:

d) supplying fluid pressure to said envelope after both a predetermined temperature of the chamber has been attained and after a predetermined length of time has been reached.

The above may also be accomplished by a tire retreading system comprising:

a fluid pressure chamber for receiving an assembly of a precured tread, disposed over a crown portion of a tire casing, and a flexible airtight member for covering the tread and at least a portion of both sidewalls of the tire casing: a manifold for receiving fluid pressure and for supplying said fluid pressure to said flexible airtight member; a supply means for supplying fluid pressure to the manifold; a temperature means for determining when said fluid pressure of said chamber reaches a predetermined temperature; a timing means for determining a predetermined amount of time; and wherein fluid pressure is prevented from being supplied to said flexible airtight member until said temperature means reaches said predetermined temperature and also until said timing means reaches said predetermined amount of time.

BRIEF DESCRIPTION OF THE DRAWINGS

The following is a brief description of the drawings in which like parts may bear like reference numerals and in which.

DESCRIPTION OF THE INVENTION

The following definitions are applicable to this specification, including the claims wherein:

"Axial" and "axially" are used herein to refer to directions and/or displacements that are parallel to the axis of rotation of a tire.

"Radial" and "radially" mean directions and/or displacements from the axis of rotation of the tire.

"Inner" means directions and/or displacements toward the inside of the tire while "outer" means directions and/or displacements toward the exterior of the tire.

Figure 1:
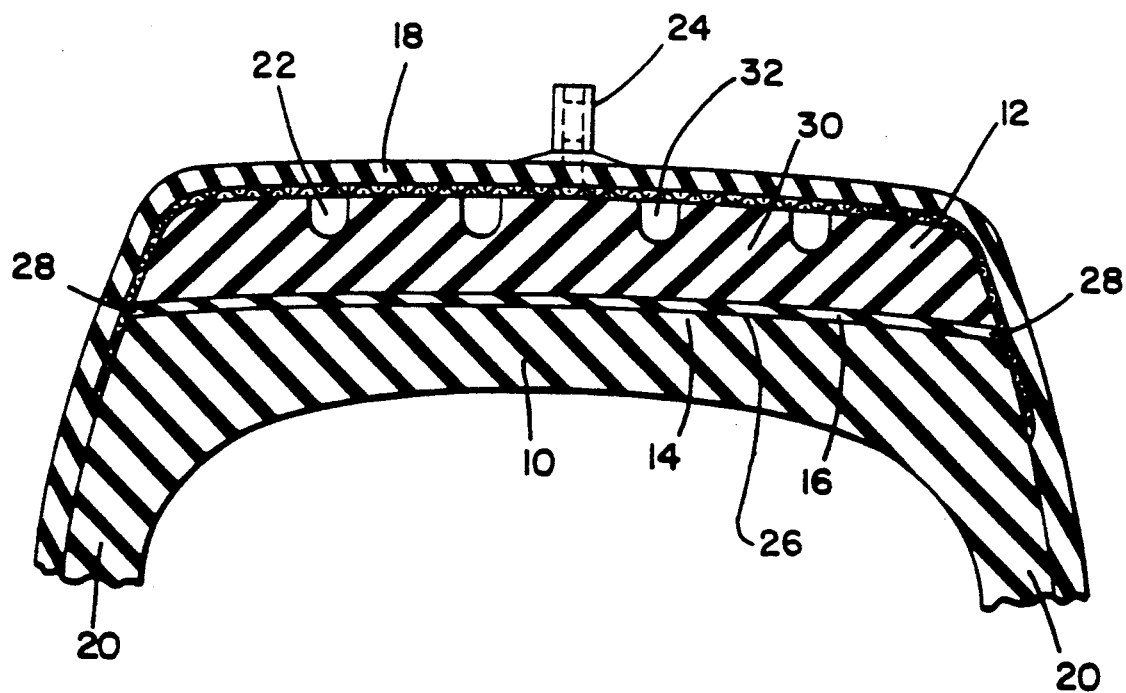
FIG. 1 is a partial cross-sectional view of a tread/casing/envelope assembly.

Now referring to FIG. 1, there is illustrated a partial cross-sectional view of a tire casing 10 having a precured rubber tread 12 located radially outwardly from the crown portion 14 of the tire casing 10. Interposed between the casing 10 and the tread 12 is a layer 16 of a vulcanizable material, also known as a cushion gum, for adhering the tread 12 to the tire casing 10. A flexible airtight member 18, also known as an envelope 18 is placed radially outwardly over the tread 12 and extends to enclose at least a portion of the sidewalls 20 of the tire casing, thereby enclosing an area 22 under the envelope 18. The envelope is further supplied with an input means 24 connecting the envelope with a source of fluid pressure.

The envelope 18 can be attached by a number of current methods known in the art, such as for example by locking it to the bead regions or the sidewall regions of the tire casing. In the preferred embodiment the envelope is held in place by a ring sealing system such as the SURE LOCK system of The Goodyear Tire and Rubber Company.

The precured tread may be a standard precured tread with one or more splice portions or it could be a one-piece spliceless precured tread such as the UNICIRCLE ™ tread as manufactured by The Goodyear Tire and Rubber Company.

As the temperature within the tire chamber increases, heat energy is transmitted to the tread/tire assembly causing a temperature increase therein. The temperature increase within the tread/tire assembly depends primarily on the tread and tire casing thicknesses and the distance from the surface. Generally, the temperature rises initially on the outer surfaces and then penetrates inwardly. At the retread bonding cushion line 26, the interface between the tread and the casing, heat is first received at the tread edges 28 causing a temperature rise which is passed axially inwardly therefrom. At a given temperature the cushion gum will begin to soften and then flow. This will occur beginning at the axial edges and propagate axially inwardly therefrom. This heating, coupled with inconsistent pressures tends to cause the cushion gum to flow unevenly from under the tread design 30, that is ribs, blocks, etc. which may then cause tread distortion.

As the temperature continues to rise, the cushion gum begins to cure, and the flow thereof, stops. This curing, like the original softening and flowing of the cushion gum begins first at the tread edges 28 and progresses axially inwardly thereof. Therefore, because the temperature is not uniform throughout some areas of the cushion gum, it may be curing while others are just beginning to flow. After curing, the results may be a non-uniform thickness of the cushion gum. For example it may be thinner at the tread edges while being thicker under the tread grooves.

In order to reduce this problem, at the point in time when the cushion gum begins to cure at the tread edges and at the surface of the tread (if required), but before the remainder of the cushion gum has received enough heat to flow significantly under the tread, the pressure applied must be equalized along the bond line to prevent the significant flow thereof. As used herein, "significantly" is not meant to include flowing of the cushion gum which is so slight as to not cause unacceptable distortion of the tread.

Figure 2:
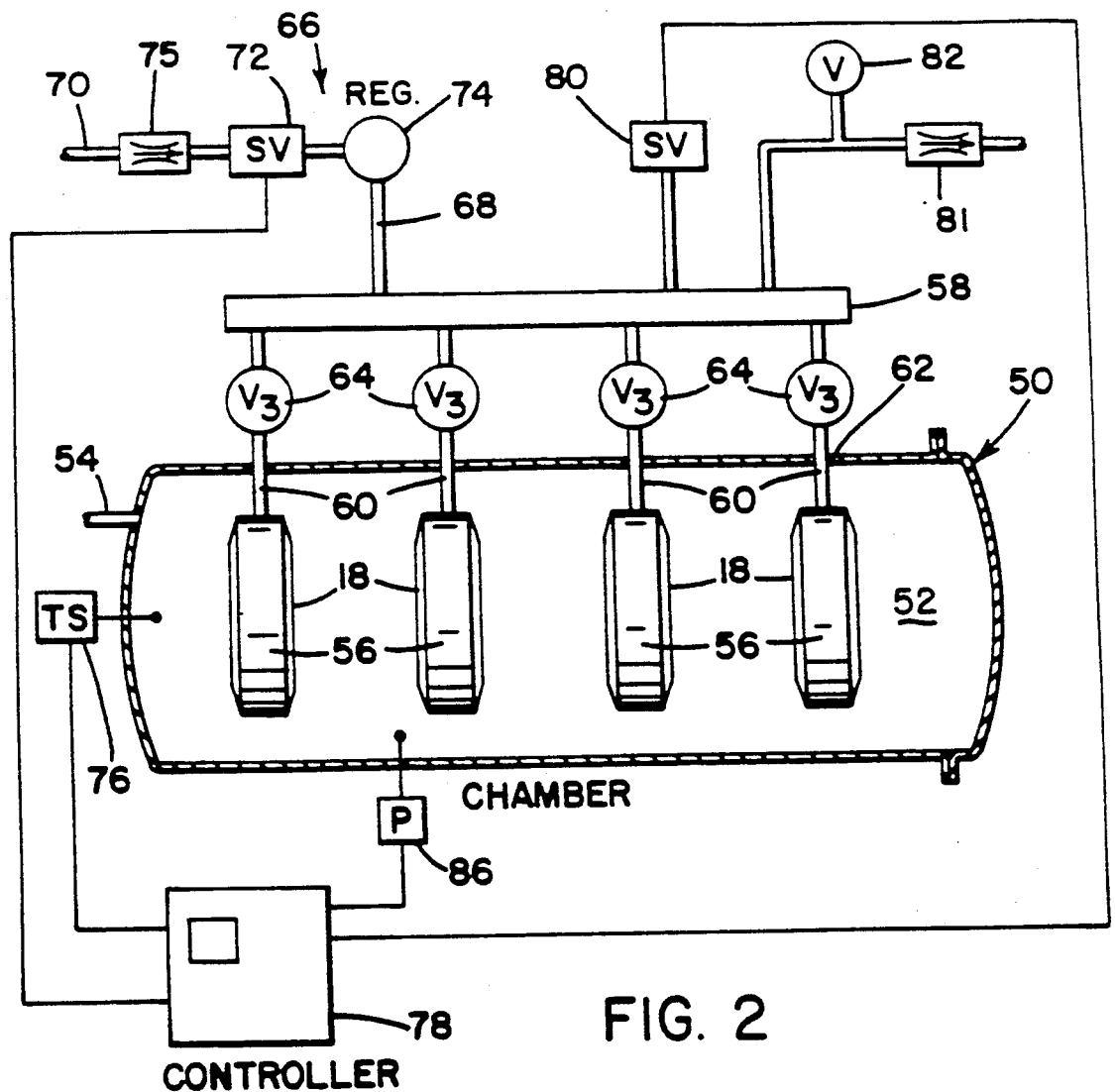
FIG. 2 is a schematic of a tire retreading system according to one embodiment of invention.
Figure 3:
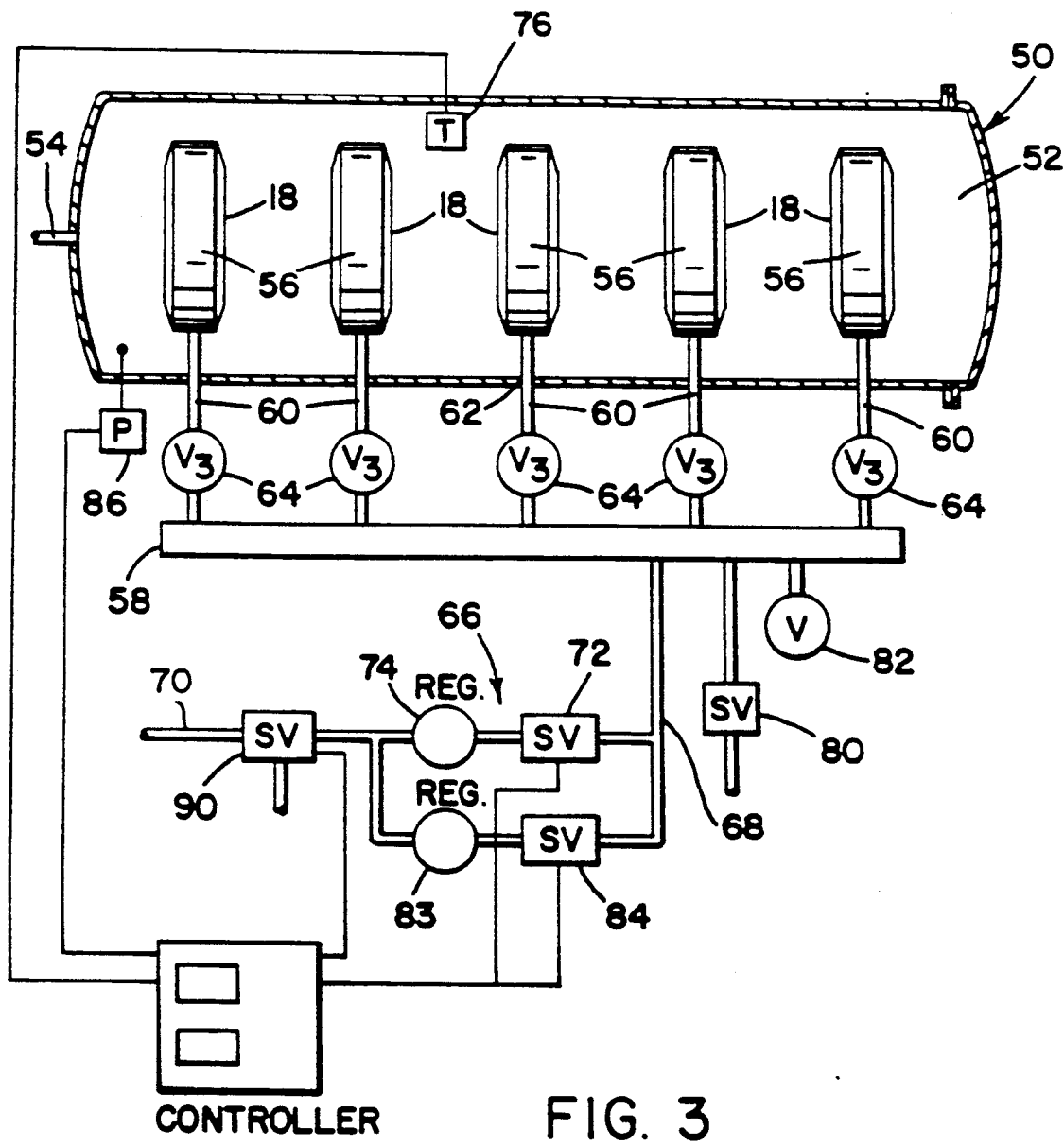
FIG. 3 is a schematic of an alternate tire retreading system according to another embodiment.

Referring to FIGS. 2 and 3, there are illustrated schematic diagrams of system for retreading tires according to embodiments of the invention. A pressure chamber or autoclave, shown generally as reference numeral 50, is adapted to received within an interior portion 52 a plurality of tread/casing/envelope assemblies 56 therein for retreading. The interior portion of the chamber is pressurized from a fluid pressure source 54. The fluid pressure is either heated before introduction into the chamber, or it can be heated within the chamber by a heater. The fluid pressure can be hot air, steam, hot water, etc.

The envelopes 18 of each assembly 56 are connected to a manifold 58 by process piping, conduits, hoses, etc. 60 passing through an outer wall 62 of the chamber 50. A three position valve 64 may be located along the conduit path 60 to the manifold 58. The valve 64 can be, closed, open (allowing passage of fluid pressure through the conduit), or it can be vented to the atmosphere. Alternatively, the three position valve may be replaced with two 2-way valves and a tee: one valve for venting and the other for opening/closing the tire from the manifold to the envelope.

Fluid pressure is supplied to the manifold 58 from a supply means 66 through a conduit 68. The supply means 66 is connected at 70 to either an external fluid pressure source, such as that used by the chamber, or it can be connected to the chamber to bleed off some of the fluid pressure that is used within the chamber. The supply means 66 may include a solenoid 72 and a regulator valve 74 connected in series. It may also include a variable rate of flow valve 75 for controlling the rate of flow of fluid pressure. This is useful if the fluid pressure source is external, such as supplied within a plant as opposed to the chamber pressure.

A temperature means 76 is provided for sensing the temperature of the chamber. The temperature means is connected to a controller 78 which includes a timing means. The temperature means could include a temperature switch which opens and closes at a specific setting or it could include a thermocouple which provides temperature information to the controller.

At the start of a cure cycle, fluid pressure and heat are supplied to the interior 52 of the chamber 50. The temperature of the chamber will increase until the normal operating temperature or curing temperature of the chamber or process is reached, at which point the temperature will be maintained until curing of the tread to the casing is complete. Until a first temperature point or setting is reached, however, the envelopes of the assemblies 56 are vented to the atmosphere.

The venting to the atmosphere of the envelope pressure can be accomplished in a number of different ways. One way is to use the three position valves 64 or the combination of two 2-way valves by setting them to the vent position until actuated by the controller to move to either the open or closed position. Another way is to set the valves 64 (3-way or the 2-way combination) to the open position to allow the passage of air from the envelopes 18 to the manifold 58. A solenoid valve 80, may then be connected to the manifold 58 that opens to vent to the atmosphere upon actuation.

The continual process of venting the envelope pressure to the atmosphere provides for the maximum pressure to be applied to the tread edges. Once the temperature of the chamber reaches a predetermined temperature, the timing means is activated for a predetermined length of time. This predetermined length of time is important to assure that the tread edges will seal and begin to cure. Alternatively the length of time may be set to start once the cure cycle begins. However, in either case both the timing function and the temperature setting must both be satisfied before the next step is undertaken. As used herein, the sealing of the edges means that the cushion gum has softened and begun to cure such that air will not infiltrate into the bond line. It does not necessarily mean that the cushion gum has completely cured at the tread edges.

It should be noted that in various prior art systems if a leak were to develop before the chamber reached full curing pressure the system would not be able to compensate and the retread could be lost due to air infiltration. In this system however, if a leak were to develop in an envelope before the tread edges were sealed the system is automatically venting to the atmosphere and the retread should not then be affected.

Once both the time and temperature conditions have been satisfied the venting to the atmosphere is stopped and fluid pressure is allowed to pass through the series combination of the regulator valve 74 and the solenoid valve 72 to fill the manifold and in turn the envelopes with fluid pressure. The fluid pressure within the envelopes provides a more uniform force against the bond line. The pressure within the envelopes does not exceed the pressure of the chamber but could be equal thereto. However, the difference is usually less than the chamber pressure such as for example 15 psi less than the chamber pressure. A preferred range being from about 15 psi to about 3 psi less than the chamber pressure.

The pressure regulator valve 74 supplies fluid pressure up to its set point. Therefore the pressure regulator is set at a value less than the curing pressure of the chamber as determined above. If a leak develops in one or more envelopes, the pressure within the manifold will begin to increase as fluid is passed from the chamber into the envelopes. A pressure relief valve 82 attached to the manifold relieves this excess pressure. If the leak is large enough the envelope which is leaking can be determined and the 3 way valve 64 associated with that assembly can be vented to the atmosphere. A variable rate of flow valve 81, however, may also be provided to the manifold to relieve pressure that is causing the pressure relief valve 82 to actuate, but which is not great enough to vent the 3-way valve 64 associated with the leaking assembly to the atmosphere.

Referring specifically to FIG. 3, in some cases it may be more preferred to operate the retreading system in at least two stages. In a two-stage system an additional pressure regulator valve 83 and solenoid 84, in series with one another, are connected in parallel with the first set of regulator 74 and solenoid 72 valves. The second regulator valve 83 is set at a pressure which is considerably less than the full chamber pressure, chamber curing pressure, and less than the setting of the first regulator 74. For example the second regulator 83 could be set at a pressure which is equal to or less than 50% of the chamber curing pressure. In any event, the pressure selected must not cause air infiltration to the tread/casing bond. It further should be noted that the setting should not be greater than the chamber pressure at that given time. This can be prevented by a pressure switch 86 which is set to be equal to or greater than the pressure setting of the second regulator valve 83. The pressure switch 86 may be connected to the controller to prevent the solenoid valve 84 from allowing fluid pressure to enter the envelope. Therefore, this prevents the envelopes from being pressurized greater than the chamber pressure. This could be a problem if the chamber is not properly pressurizing but has heated enough to activate the temperature means.

The operation of the cure cycle begins with the addition of fluid pressure to the tire chamber. As the pressure and temperature within the chamber increases the envelopes are vented to the atmosphere as above. Once a first temperature setting has been reached the venting of the envelopes is stopped and solenoid valve 84 is opened allowing fluid pressure to pass through the second regulator 83 to fill the envelopes at the first pressure level set by the regulator 83. After a length of time has passed, which should assure that the tread edges have sealed, solenoid valve 84 closes and solenoid valve 72 is opened bringing the envelope pressure to the higher setting of the first regulator 74. At the end of the curing cycle, blow down of the envelopes could be accomplished by the solenoid valve 80. Pressure could be further vented from the supply means 66 by the addition of a three-way solenoid valve 90 along the conduct path 70 having an open, close and vent position.

Although not intended to be limited thereto a retread system could for example have the regulator valve 83 set for 65 psig and regulator 74 set for 82 psig, for a curing pressure of 85 psig. The temperature setting could be from about 235°-240° F. for a system having a 260° F. curing temperature and the time period at which the system maintained the 65 psig would be for about 15 minutes.

Figure 4A:
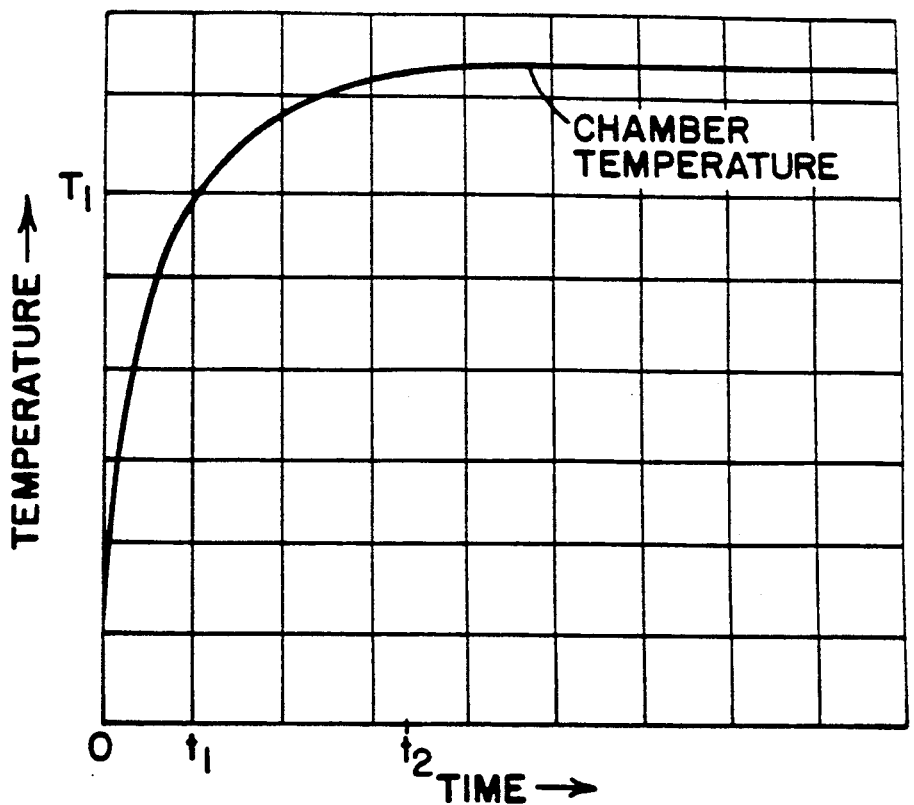
FIGS. 4A and 4B are graphs of the chamber temperature vs time and the pressure under the envelope vs time respectively for the retreading system of FIG. 3.
Figure 4B:
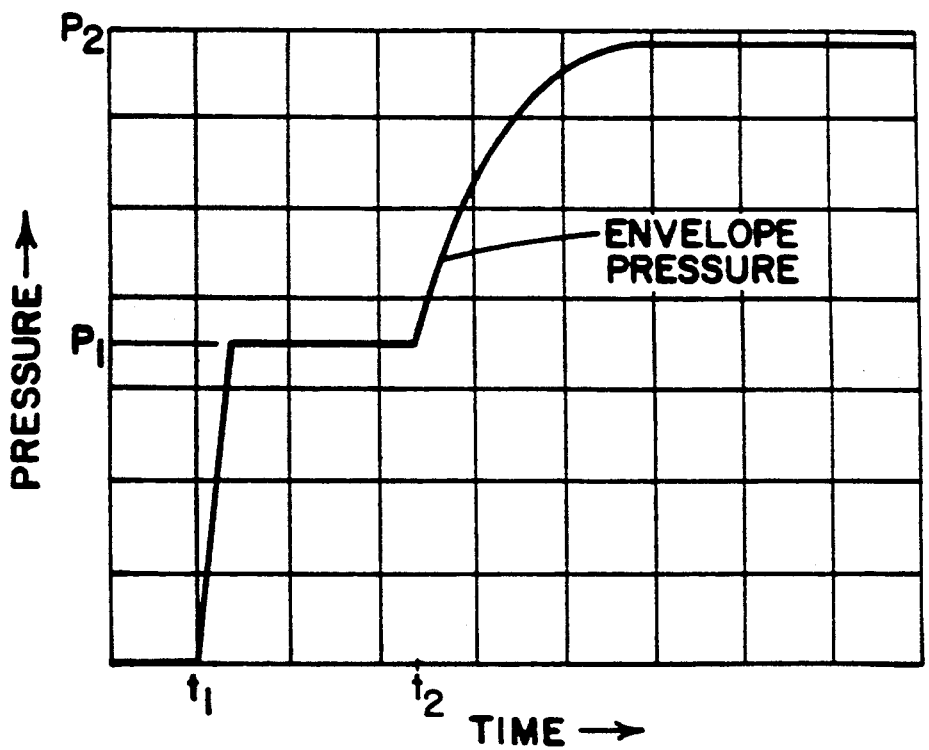

Referring to FIGS. 4A and 4B there are illustrated two graphs, one of the chamber temperatures vs time and the other of the envelope pressure vs time for the dual stage system. $t_1$ represents the chamber temperature at which point the envelope pressure is increased from 0 psig to $P_1$ at time $t_1$. The pressure P1 is maintained till time $t_2$ at which the envelope pressure is increased to a pressure which is less than the operating or curing pressure $P_2$ of the chamber.

Figure 5:
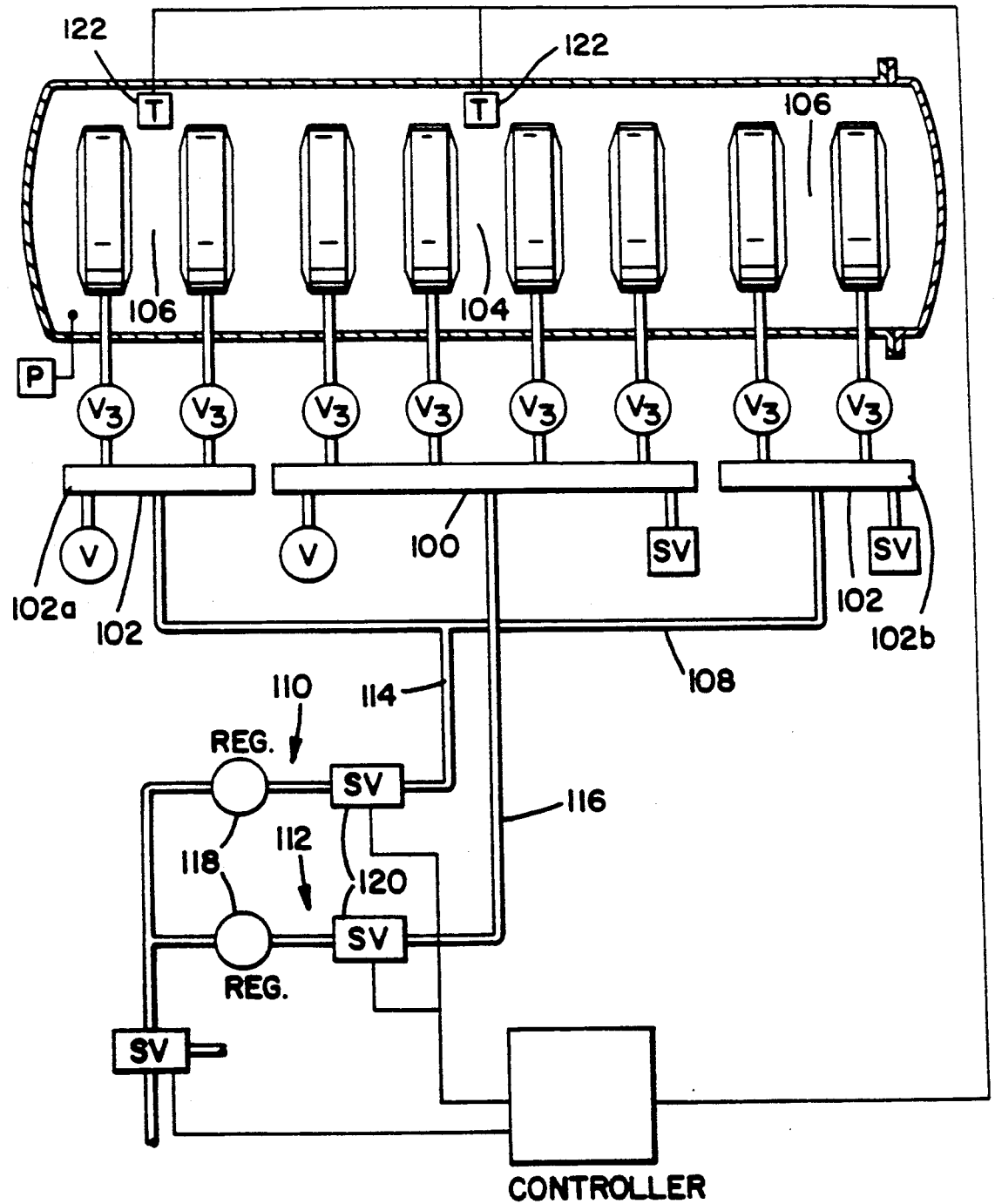
FIG. 5 is a schematic of an alternate tire retreading system according to another embodiment of the invention.

Now referring to FIG. 5 there is illustrated a multiple system having two manifolds 100, 102. In some retread chambers the temperature within the chamber may not be exactly uniform. In such cases, it may then be better to activate those tires in the hotter regions first, because they will reach the predetermined temperature first, and then activate those in the cooler regions at a later time. For example in some chambers the central portions 104 of the chamber heats more slowly than the end portions 106. In such cases the retreading system can be supplied with a central manifold 100, supplying retread assemblies in the central region 104. The assemblies of the end portions can be supplied by a split manifold 102 having a first portion 102a, and a second portion 102b. The two portions 102a, 102b can then be joined by a conduit 108. Each manifold is then connected to a supply means 110, 112 by conduits 114 and 116 respectfully. The supply means may be either the single stage system having a regulator valve 118 and a solenoid 120 or they could be the dual stage system as described above having additional regulator and solenoid valves in parallel with the first set.

In this manner the tire assemblies of one manifold would be activated independently of the tire assemblies of the other. Each manifold would require at least one temperature sensing means 122 to activate their portion of the system. More manifolds, supply means, temperature sensors, etc. could of course be employed as required to reduce the influences of temperature fluctuation within the chamber.

Furthermore, the invention described herein is also suitable to be used with retreading systems which employ the use of a curing bladder.

While certain representative embodiments and details have been shown for the purpose of illustrating the invention, it will be apparent to those skilled in this art that various changes and modifications may be made therein without departing from the scope of the invention.

It is claimed:

1. A tire retreading system comprising:
   a fluid pressure chamber for receiving an assembly of a precured tread disposed over a crown portion of a tire casing, and a flexible airtight member for covering the tread and at least a portion of both sidewalls of the tire casing;
   b) a first supply means for supplying fluid pressure to the chamber;
   c) a manifold for receiving fluid pressure and for supplying said fluid pressure to said flexible airtight member;
   d) a means for venting the manifold;
   e) a second supply means for supplying fluid pressure to the manifold, the second supply means being a two stage device having a first and second portion connected in parallel to one another, each portion including a pressure regulator valve and a solenoid valve connected in series;
   f) a pressure means for determining a predetermined pressure of the chamber;
   g) a temperature means for determining when said fluid pressure of said chamber reaches a predetermined temperature;
   h) a controller, the controller including a timing means for determining a predetermined amount of time; and
   wherein the system can be operated such that the manifold is vented to the atmosphere until the predetermined temperature of the fluid pressure within the chamber is achieved at which point the temperature means senses the temperature and signals the controller to activate the timing means, after a predetermined amount of time the manifold venting means closes and the solenoid valve opens and fluid pressure is received by the manifold the manifold supplying the fluid pressure to the flexible airtight member, the controller and solenoid valves prevent the flexible airtight member from receiving fluid pressure until the chamber has reached or exceeded the predetermined pressure.

2. The system of claim 1 further comprising a means connected to said manifold for evacuating fluid pressure from said manifold.

3. The system of claim 1 further comprising a means for evacuating fluid pressure from said flexible airtight member.

4. A system for affixing precured treads to crown portions of a tire casing forming tire assemblies, said system comprising:
   a) a fluid pressure chamber for receiving said assemblies, said chamber being supplied with fluid pressure;
   b) a first supply means for supplying fluid pressure to said chamber;
   c) plurality of a flexible airtight members for covering the tread and at least a portion of both sidewalls of the tire casing of said assemblies;
   d) a central manifold for receiving fluid pressure and for supplying said fluid pressure to some of said flexible airtight members;
   e) a split-manifold for receiving fluid pressure and for supplying said fluid pressure to the remainder of said flexible airtight members;
   f) a second and third supply means for supplying fluid pressure to said central and split manifolds respectively, each second and third supply means being a two stage device having a first and second portion connected in parallel to one another, each portion including a pressure regulator valve and a solenoid valve connected in series;
   g) a pressure means for determining a predetermined pressure of the chamber;
   h) first and second temperature means for determining predetermined temperatures;
   i) first and second means for determining a predetermined amount of time; and
   wherein the system can be operated such that said second supply means is prevented from supplying fluid pressure to said central manifold until said first temperature means reaches said predetermined temperature and said first timing means reaches said predetermined amount of time and said third supply means is prevented from supplying fluid pressure to said split manifold until said second temperature means reaches said predetermined temperature and said second timing means reaches said predetermined amount of time.

5. The system of claim 4 further comprising a first and second means for evacuating fluid pressure from said central and split manifolds respectfully.

* * * * *